US012786131B2

(12) United States Patent
Ali et al.

(10) Patent No.: US 12,786,131 B2
(45) Date of Patent: Nov. 3, 2026

(54) MACHINE LEARNING BASED SYSTEM(S) FOR NETWORK TRAFFIC DISCOVERY AND ANALYSIS

(71) Applicant: BANK OF AMERICA CORPORATION, Charlotte, NC (US)

(72) Inventors: Amer Ali, Jersey City, NJ (US); Brian Daniel Christman, Dublin, TX (US); Kamal D Sharma, Mason, OH (US); Gilbert Gatchalian, Union, NJ (US); Karthik Rajagopalan, Glen Allen, VA (US); Kevin A. Delson, Woodland Hills, CA (US); Robert Ronald Rosseland, Jr., Huntersville, NC (US); Yassine Touahri, Charlotte, NC (US); Jyothishwar Reddy Sama, Fort Mill, SC (US); Zaheeruddin Mohammed, Hyderabad (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 945 days.

(21) Appl. No.: 17/957,848

(22) Filed: Sep. 30, 2022

(65) Prior Publication Data

US 2024/0113977 A1 Apr. 4, 2024

(51) Int. Cl.
*H04L 47/2425* (2022.01)
*H04L 41/16* (2022.01)

(52) U.S. Cl.
CPC .......... *H04L 47/2425* (2013.01); *H04L 41/16* (2013.01)

(58) Field of Classification Search
CPC ............................ H04L 47/2425; H04L 43/16
See application file for complete search history.

(56) References Cited

U.S. PATENT DOCUMENTS

| | | | |
|---|---|---|---|
| 5,651,133 | A | 7/1997 | Burkes |
| 5,799,200 | A | 8/1998 | Brant |
| 5,933,598 | A | 8/1999 | Scales |
| 6,012,032 | A | 1/2000 | Donovan |
| 6,085,333 | A | 7/2000 | DeKoning |
| 6,643,641 | B1 | 11/2003 | Snyder |
| 6,647,514 | B1 | 11/2003 | Umberger |
| 6,728,738 | B2 | 4/2004 | Wolczko |
| 6,789,162 | B1 | 9/2004 | Talagala |
| 6,831,865 | B2 | 12/2004 | Chang |
| 6,857,045 | B2 | 2/2005 | Galbraith |
| 6,895,464 | B2 | 5/2005 | Chow |
| 6,917,947 | B2 | 7/2005 | Jameson |
| 7,032,089 | B1 | 4/2006 | Ranade |
| 7,072,905 | B2 | 7/2006 | Garthwaite |

(Continued)

*Primary Examiner* — Romani Ohri
(74) *Attorney, Agent, or Firm* — Moore & Van Allen PLLC; Nicholas C. Russell

(57) ABSTRACT

Systems, computer program products, and methods are described herein for network traffic discovery and analysis. The present invention is configured to capture data traffic across network ports in a computing environment; retrieve source code from code repositories; determine that the data traffic and the source code are associated with application programming interface (API) traffic; determine a first API associated with the API traffic; determine, using a machine learning (ML) subsystem, whether the first API meets supervisory requirements; and invoke a remediation protocol in an instance when the first API does not meet supervisory requirements.

17 Claims, 5 Drawing Sheets

(56) References Cited

U.S. PATENT DOCUMENTS

| | | | | |
|---|---|---|---|---|
| 7,146,521 | B1 | 12/2006 | Nguyen | |
| 7,181,580 | B2 | 2/2007 | Erickson | |
| 7,334,124 | B2 | 2/2008 | Pham | |
| 7,434,097 | B2 | 10/2008 | Guha | |
| 7,437,530 | B1 | 10/2008 | Rajan | |
| 10,740,164 | B1 * | 8/2020 | Roy | G06N 3/09 |
| 10,810,065 | B1 * | 10/2020 | Banerjee | G06F 9/546 |
| 11,467,887 | B1 * | 10/2022 | Caudill | G06F 9/54 |
| 2016/0381070 | A1 * | 12/2016 | Zhang | H04L 63/1466 726/23 |
| 2020/0137103 | A1 * | 4/2020 | Ngo | G06F 40/20 |

* cited by examiner

MACHINE LEARNING BASED SYSTEM(S) FOR NETWORK TRAFFIC DISCOVERY AND ANALYSIS

FIELD OF THE INVENTION

The present invention embraces a machine learning based system(s) for network traffic discovery and analysis.

BACKGROUND

An Application Programming Interface (API) allows software applications to interact with each other. It is a fundamental part of modern software patterns, such as microservices architectures. API security is the process of protecting APIs from unauthorized access. Due to their common use across computing environments, and their ability to access sensitive software functions and data, APIs pose are likely to become targets for misappropriate use for unauthorized persons. API security is a key component of modern web application security to identify and remediate API vulnerabilities.

There is a need for an efficient end-to-end security solution to discover, analyze, normalize and remediate APIs in any environment using machine learning techniques.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for network traffic discovery and analysis is presented. The system comprising: a non-transitory storage device; and a processor coupled to the non-transitory storage device, wherein the processor is configured to: capture data traffic across network ports in a computing environment; retrieve source code from code repositories; determine that the data traffic and the source code are associated with application programming interface (API) traffic; determine a first API associated with the API traffic; determine, using a machine learning (ML) subsystem, whether the first API meets supervisory requirements; and invoke a remediation protocol in an instance when the first API does not meet supervisory requirements.

In some embodiments, in determining the first API associated with the API traffic, the processor is further configured to: determine a destination IP address from the API traffic; map the destination IP address to a first end-point device; and determine that the first end-point device is associated with the first API.

In some embodiments, the processor is further configured to: receive API-related data traffic associated with the one or more APIs, one or more supervisory requirements for the one or more APIs, and one or more indications of whether the one or more APIs meet the one or more supervisory requirements for the one or more APIs; generate a first feature set using the API-related data traffic associated with the one or more APIs, the one or more supervisory requirements for the one or more APIs, and the one or more indications of whether the one or more APIs meet the one or more supervisory requirements for the one or more APIs; and train, using the ML subsystem, a first ML model using the first feature set.

In some embodiments, the processor is further configured to: monitor API-related data traffic associated with the first API for a first time period; and capture data metrics from with the API-related data traffic associated with the first API.

In some embodiments, the processor is further configured to: deploy, via the ML subsystem, a first trained ML model on the data metrics captured from with the API-related data traffic and the supervisory requirements associated with the first API; determine, via the first trained ML model, a likelihood of adherence of the first API to the supervisory requirements; and determine that the first API meets the supervisory requirements in an instance in which the likelihood of adherence of the first API to the supervisory requirements satisfies a security threshold.

In some embodiments, the processor is further configured to: determine that the first API does not meet the supervisory requirements in an instance in which the likelihood of adherence of the first API to the supervisory requirements does not satisfy the security threshold.

In some embodiments, in invoking the remediation protocol, the processor is further configured to execute a first set of remediation actions on the first API, wherein the first set of remediation actions, when executed, ensure that the likelihood of adherence of the first API to the supervisory requirements satisfies the security threshold.

In some embodiments, the processor is further configured to: deploy, via the ML subsystem, a second trained ML model on the data metrics captured from with the API-related data traffic associated with the first API; determine, via the second trained ML model, a likelihood that the first API is affected by a first exposure vector; and determine that the first API is affected by the first exposure vector in an instance in which the likelihood that the first API is affected by a first exposure vector satisfies an exposure threshold.

In some embodiments, the processor is further configured to: invoke the remediation protocol in an instance when the first API is affected by the first exposure vector.

In some embodiments, in invoking the remediation protocol, the processor is further configured to execute a second set of remediation actions on the first API, wherein the second set of remediation actions, when executed, ensure that the likelihood that the first API is affected by a first exposure vector does not satisfy the exposure threshold.

In some embodiments, the processor is further configured to: determine a second API associated with the API traffic; determine one or more end-point devices associated with the second API; transmit a notification to the one or more end-point devices, wherein the notification comprises a recommendation to use the first API instead of the second API.

In another aspect, a computer program product for network traffic discovery and analysis is presented. The computer program product comprising a non-transitory computer-readable medium comprising code causing an apparatus to: capture data traffic across network ports in a computing environment; retrieve source code from code repositories; determine that the data traffic and the source code are associated with application programming interface (API) traffic; determine a first API associated with the API traffic; determine, using a machine learning (ML) subsystem, whether the first API meets supervisory requirements; and invoke a remediation protocol in an instance when the first API does not meet supervisory requirements.

In yet another aspect, method for network traffic discovery and analysis is presented. The method comprising: capturing data traffic across network ports in a computing environment; retrieving source code from code repositories; determining that the data traffic and the source code are associated with application programming interface (API) traffic; determining a first API associated with the API traffic; determining, using a machine learning (ML) subsystem, whether the first API meets supervisory requirements; and invoking a remediation protocol in an instance when the first API does not meet supervisory requirements.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
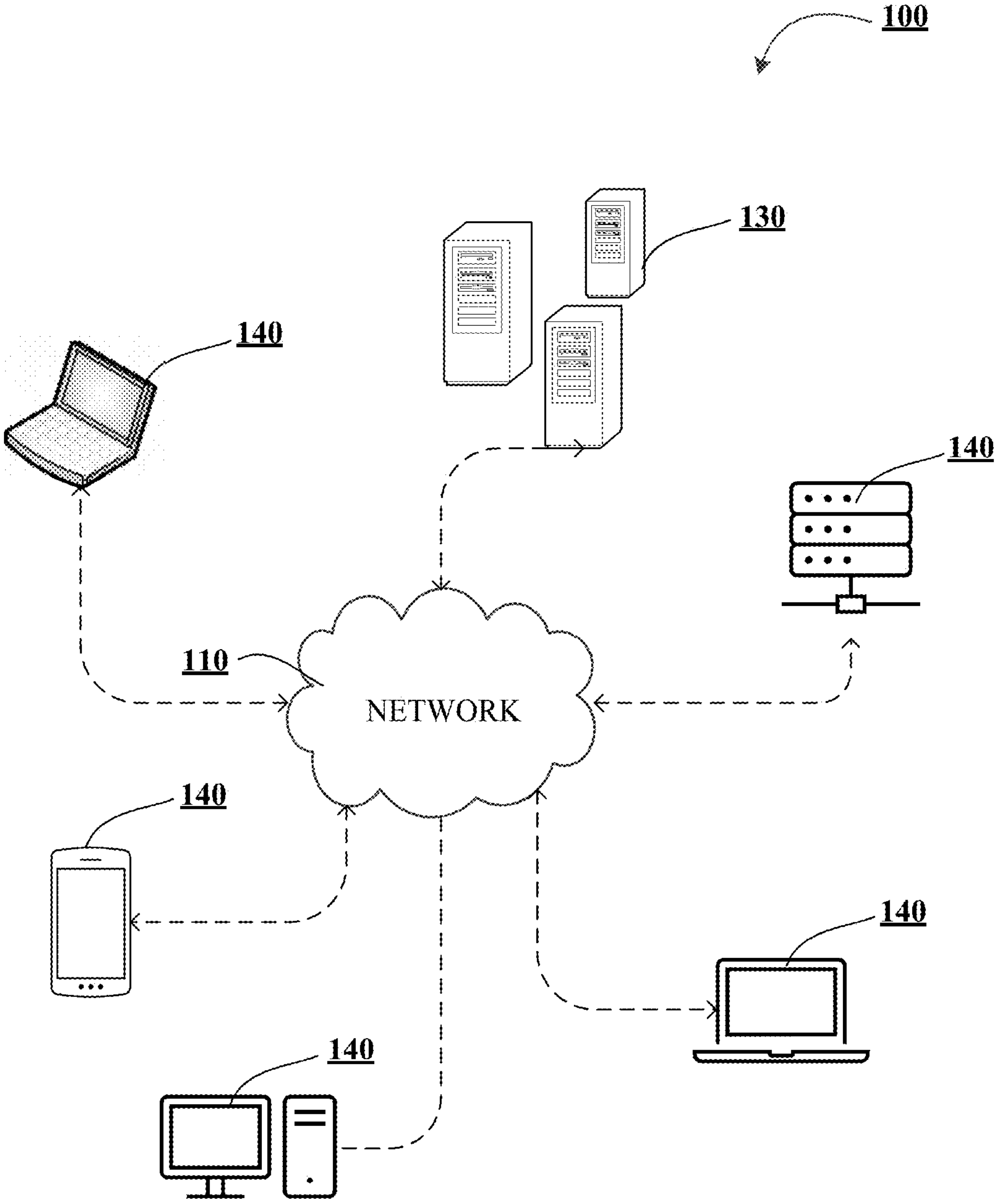
Figure 1B:
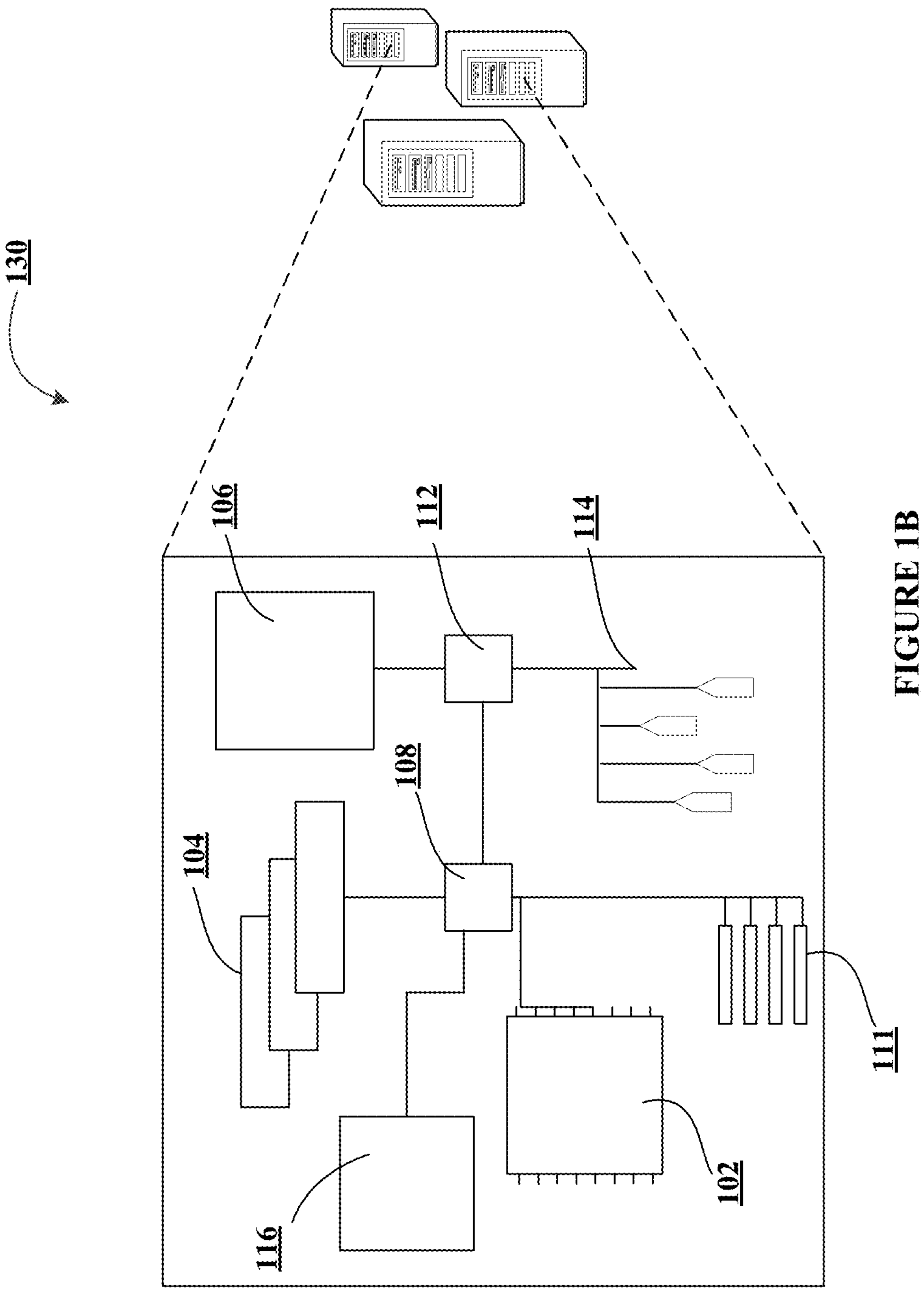
Figure 1C:
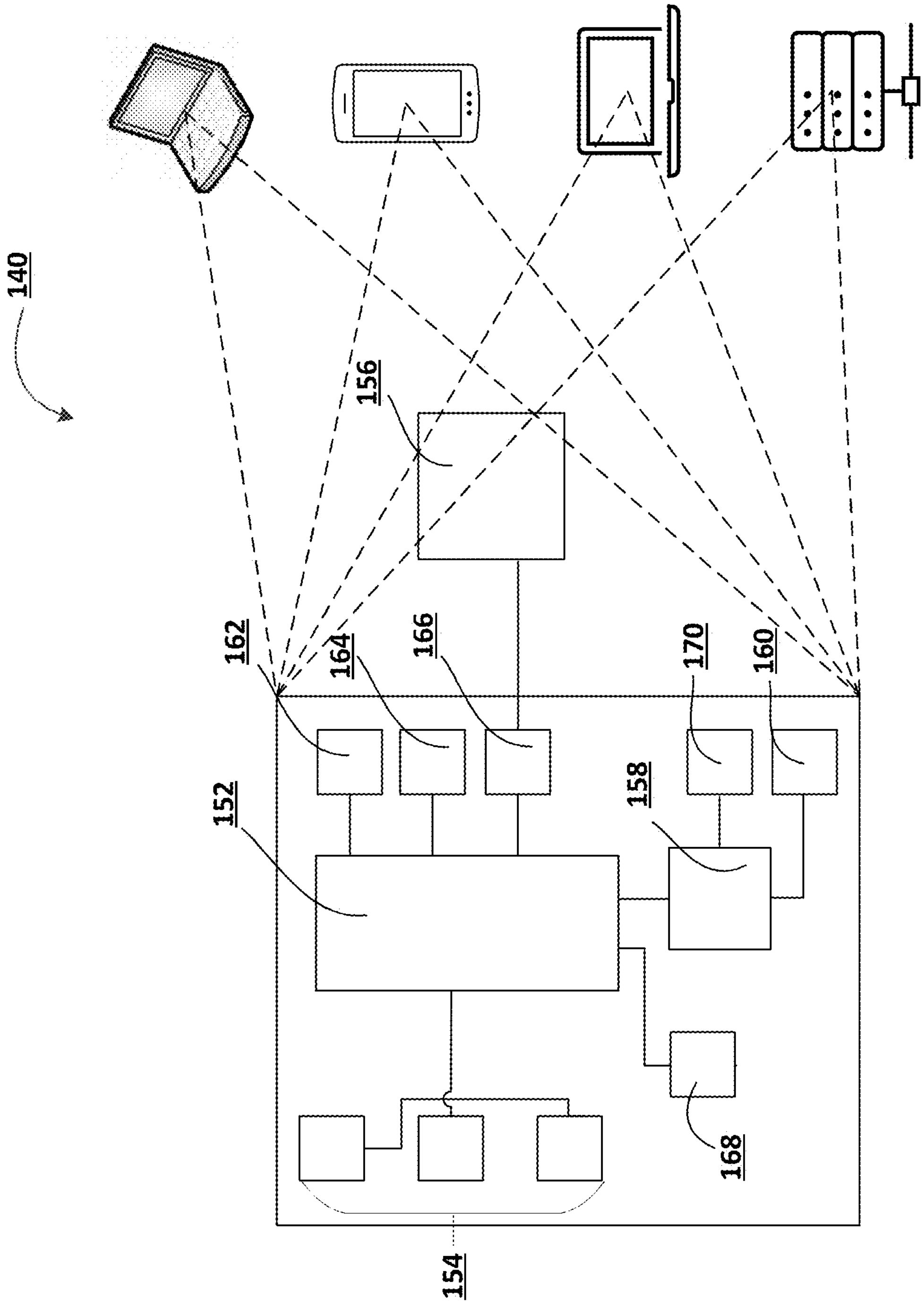
Figure 2:
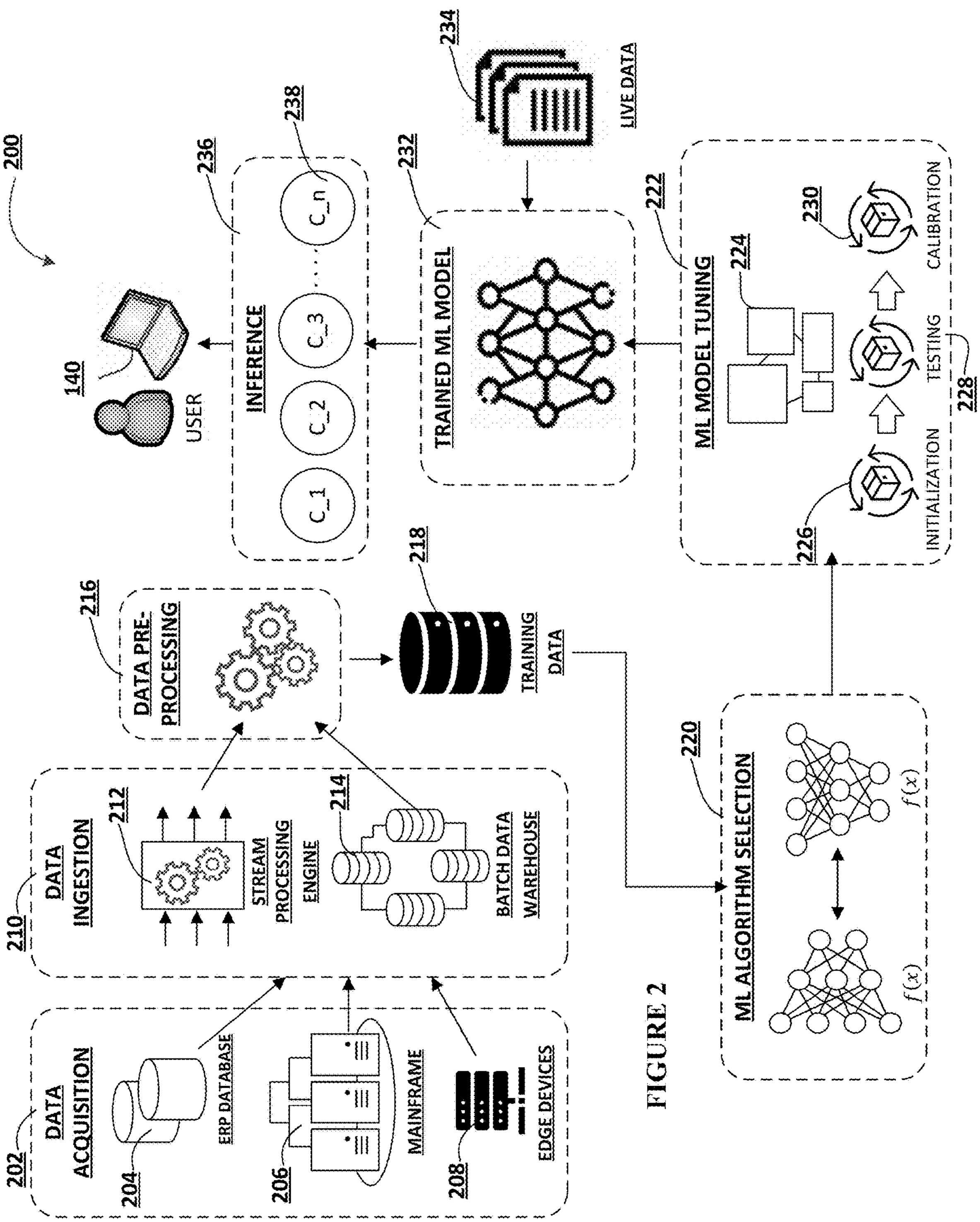
Figure 3:
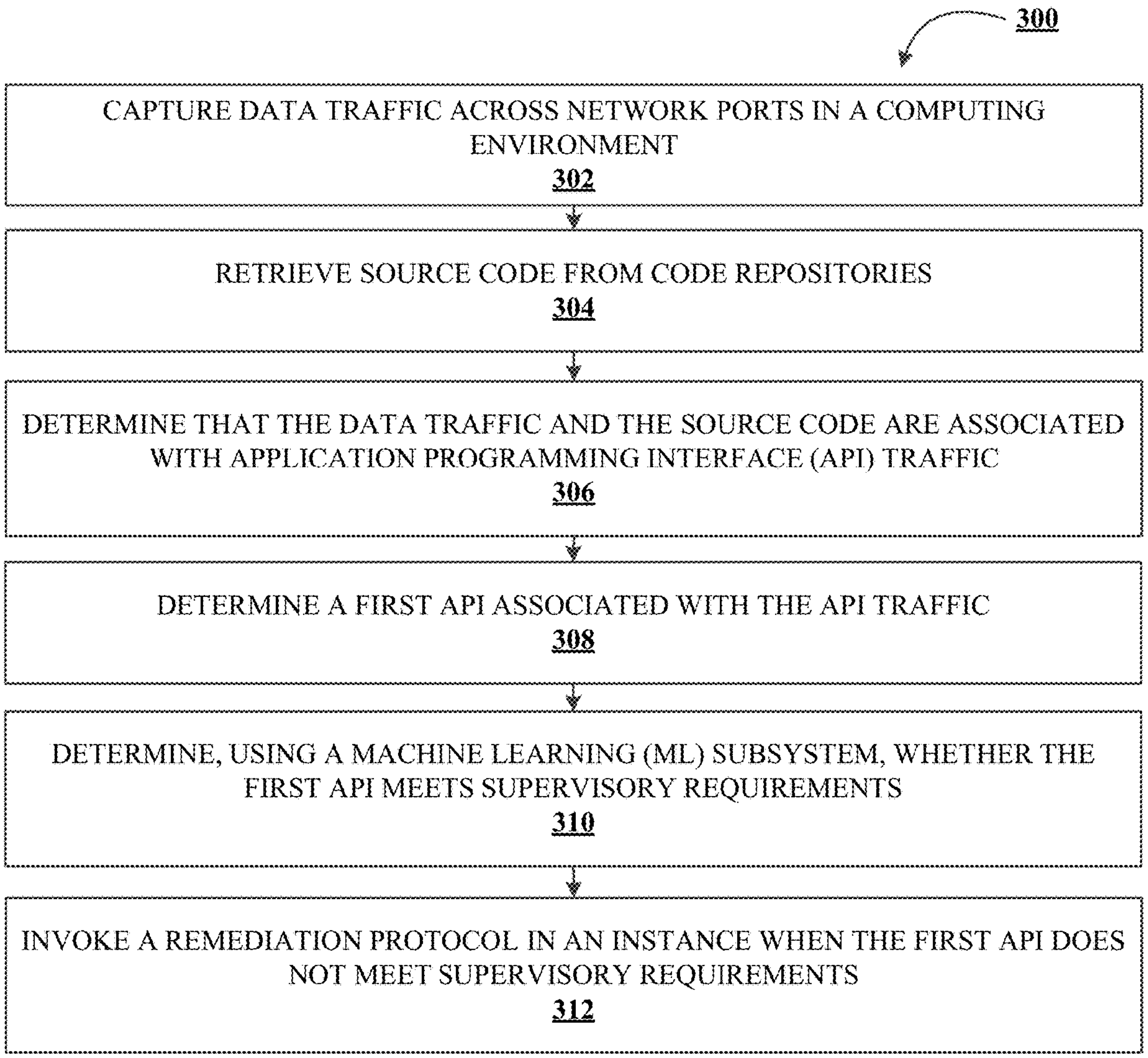

Having thus described embodiments of the invention in general terms, reference will now be made the accompanying drawings, wherein:

FIGS. 1A-1C illustrates technical components of an exemplary distributed computing environment for network traffic discovery and analysis, in accordance with an embodiment of the invention;

FIG. 2 illustrates an exemplary machine learning (ML) subsystem architecture 200, in accordance with an embodiment of the invention; and FIG. 3 illustrates a process flow for network traffic discovery and analysis, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term “a” and/or “an” shall mean “one or more,” even though the phrase “one or more” is also used herein. Furthermore, when it is said herein that something is “based on” something else, it may be based on one or more other things as well. In other words, unless expressly indicated otherwise, as used herein “based on” means “based at least in part on” or “based at least partially on.” Like numbers refer to like elements throughout.

As used herein, an “entity” may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a “user” may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a “user interface” may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an “engine” may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, “authentication credentials” may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

An Application Programming Interface (API) allows software applications to interact with each other. It is a fundamental part of modern software patterns, such as microservices architectures. API security is the process of protecting APIs from unauthorized access. Due to their common use across computing environments, and their ability to access sensitive software functions and data, APIs pose are likely to become targets for misappropriate use for unauthorized persons. API security is a key component of modern web application security to identify and remediate API vulnerabilities. Therefore, there is a need for an efficient end-to-end security solution to discover, analyze, normalize and remediate APIs in any environment using machine learning techniques.

Accordingly, the present invention, (i) Captures data traffic across network ports in a computing environment. Capturing data traffic may include collecting, storing, and analyzing network traffic across the various network ports (e.g., switches, optical modules, servers, hosts, etc.) within the network environment. In addition to network ports, the system may capture data traffic using information from featuring applications such as application performance monitoring tools, logging and analytics tools, system level performance collectors, and/or the like, employed protocols, communication endpoints, traffic direction, traffic volume, and/or the like, (ii) Retrieves source code from code repositories and determine which of the source codes generate API traffic, (iii) Determines that the data traffic and the source code are associated with application programming interface (API) traffic. Analyzes the structure of the requests and responses (e.g., using header information) associated with the data traffic to better understand the origin and intended use. Determines a first API associated with the API traffic. Determines a destination IP address from the API traffic and map the destination IP address to an end-point device. When registering with the entity, each end-point device may be required to record device information, associated IP addresses, and a list of APIs that have been authorized by the entity for use. The API traffic is then determined to be associated with one of the APIs (e.g., first API). Determines whether the API has been authorized and/or catalogued by the entity for use. Analyzes the API traffic to determine whether the API traffic is associated with any duplicate APIs (e.g., second API) in addition to being associated with the first API, (iv) Determines, using a machine learning (ML) subsystem, whether the first API meets supervisory requirements. Invokes a remediation protocol in an instance when the first API does not meet supervisory requirements, and (v) Analyzes the API-related data traffic from the first API to determine whether the first API may be affected by exposure vectors. Invokes the remediation protocol to address the first exposure vector.

What is more, the present invention provides a technical solution to a technical problem. The technical solution presented herein provides the system with the ability to automatically discover and inventory API usage and behavior, allow for near real-time API related reporting, and eliminate manual exploration that occurs across an extended period by a large number of resources in significant events. Furthermore, by providing a more accurate solution to problem, the present invention reduces the number of resources required to remedy any errors made due to a less accurate solution. In addition, by removing manual input and waste from the implementation of the solution, the present invention improves speed and efficiency of the process and conserving computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for network traffic discovery and analysis 100, in accordance with an embodiment of the invention. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the invention. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., C_1, C_2 . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . C_n 238) live data 234 based on how similar they are to one another to solve exploratory challenges where little is known about the data, provide a description or label (e.g., C_1, C_2 . . . C_n 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a process flow for network traffic discovery and analysis, in accordance with an embodiment of the invention. As shown in block 302, the process flow includes capturing data traffic across network ports in a computing environment. In some embodiments, capturing data traffic may include collecting, storing, and analyzing network traffic across the various network ports (e.g., switches, optical modules, servers, hosts, etc.) within the network environment, from multiple resources in real-time or near real-time. The present disclosure, therefore, contemplates that the network ports described herein may operate to transmit data, signals, and information to and receive data, signals, and information from any device communicably coupled thereto regardless of reference to input or output. In addition to network ports, the system may capture data traffic using information from featuring applications such as application performance monitoring tools, logging and analytics tools, system level performance collectors, and/or the like, employed protocols, communication endpoints, traffic direction, traffic volume, and/or the like. Capturing data traffic provides valuable insight and visibility into various network components (e.g., network ports) and their operations.

Next, as shown in block 304, the process flow includes retrieving source code from code repositories. As used herein, a code repository may be a file archive and web hosting facility where programmers, software developers, and designers store large amounts of source code for the software and/or web pages for safekeeping, and in some cases, automate software builds. In some embodiments, the system may be configured to access the source code stored in the code repositories and determine which of the source codes generate API traffic.

Next, as shown in block 306, the process flow includes determining that the data traffic and the source code are associated with application programming interface (API) traffic. APIs, in some embodiments, are mechanisms that enable two software components to communicate with each other using a set of definitions and protocols. In the context of APIs, the Application may refer to any software with a distinct function. Interface may refer to a contract of service between two applications. This contract defines how the two applications communicate with each other using requests and responses. The associated API documentation may contain information on how developers structure the requests and responses between the applications. In some embodiments, in determining that the data traffic and the source code are associated with API traffic, the system may be configured to analyze the structure of the requests and responses (e.g., using header information) associated with the data traffic to better understand the origin and intended use.

Next, as shown in block 308, the process flow includes determining a first API associated with the API traffic. In some embodiments, in determining that the first API is associated with the API traffic, the system may be configured to determine a destination IP address from the API traffic and map the destination IP address to an end-point device. In one aspect, each end-point device that is associated with the network environment (e.g., computing environment 100) may be pre-registered with the entity. In registering with the entity, each end-point device may be required to record device information, associated IP addresses, and a list of APIs that have been authorized by the entity for use. The API traffic is then determined to be associated with one of the APIs (e.g., first API).

In response to identifying the API (e.g., first API), the system may be configured to determine whether the API has been authorized and/or catalogued by the entity for use. If the API has been authorized and/or catalogued by the entity for use by the end-point device, the system may be configured to continually review the API's record and enrich the catalogue with discovered information (e.g., API traffic). On the other hand, if the API is not authorized and/or catalogued for use by the end-point use, the system may be configured to use the API traffic to catalogue the API.

In some embodiments, the system may be configured to analyze the API traffic to determine whether the API traffic is associated with any duplicate APIs (e.g., second API) in addition to being associated with the first API. In cases where any duplicate APIs are identified, the system may be configured to determine one or more end-point devices associated with the second API, and in response, transmit a notification to the one or more end-point devices recommending the use of the first API instead of the second API.

Next, as shown in block 310, the process flow includes determining, using a machine learning (ML) subsystem, whether the first API meets supervisory requirements. In some embodiments, the system may be configured to monitor the first API and obtain API-related data traffic associated with the first API for a particular time period (e.g., first time period). From the API-related data traffic, the system may be configured to capture specific data metrics that may be used to determine whether the API meets preset supervisory requirements. In some embodiments, the supervisory requirements may establish particular security controls and protocols that focus on network traffic operations, and more particularly for data traffic that traverse internal and/or external networks. These supervisory requirements may define authorization requirements, security protocol requirements, encryption requirements, end-point use restrictions, security standard adherence, cryptographic segmentation requirements, and/or the like for any software (e.g., first API) or hardware (e.g., end-point device) that can access the API-related data traffic.

In some embodiments, to determine whether the API-related data traffic meets the supervisory requirements, the system may be configured to deploy, via the ML subsystem, a first trained ML model on the data metrics captured from with the API-related data traffic and the supervisory requirements specific to the first API. As described herein, a trained ML model may refer to a mathematical model generated by machine learning algorithms based on training data, to make predictions or decisions without being explicitly programmed to do so. To train the ML model, the system may be configured to use API-related data traffic associated with the APIs. As described herein, each API may be subject to specific supervisory requirements. These supervisory requirements, in some embodiments, may be determined based on an exposure score associated with the API. For example, APIs with higher exposure scores are subject to more stringent supervisory requirements, such as multi-factor authentication requirement, complex encryption and/or data obfuscation requirement, and/or the like, while APIs with lower exposure scores are subject to less stringent supervisory requirements. In some embodiments, the exposure scores for the APIs may be determined by harvesting data from various application inventory systems and featuring applications, such as information security tools.

In some embodiments, the APIs and their supervisory requirements are enriched using indications of whether the APIs meet (or have met) the supervisory requirements. Once enriched, the system may be configured to generate a first feature set using the API-related data traffic associated with the APIs, the supervisory requirements for the APIs, and the one or more indications of whether the APIs meet the supervisory requirements. This feature set is then used as training data to train the first ML model. Once trained, the first ML model may be used to determine a likelihood of adherence of the first API to the supervisory requirements.

In some embodiments, to determine whether the first API meets the supervisory requirements, the system may be configured to establish a security threshold. If the likelihood of adherence of the first API to the supervisory requirements satisfies the security threshold, then the system may be configured to determine that the first API meets the supervisory requirements. On the other hand, if the likelihood of adherence of the first API to the supervisory requirements does not satisfy the security threshold, then the system may be configured to determine that the first API does not meet the supervisory requirements.

Next, as shown in block 312, the process flow includes invoking a remediation protocol in an instance when the first API does not meet supervisory requirements. In cases where the first API does not meet the supervisory requirements, the system may be configured to execute a first set of remediation actions on the first API. The first set of remediation actions, when executed, ensure that the likelihood of adherence of the first API to the supervisory requirements satisfies the security threshold, and that the first API meets the supervisory requirements. In some embodiments, these remediation actions may include code change requirements, software version updates, hardware component upgrades, elevated authorization requirements, restricted usage parameters, and/or the like. In one aspect these remediation actions may be automatically implemented. In another aspect, these remediation actions may be recommended for execution, and may be implemented manually by a user.

In addition to determining whether the first API meets supervisory requirements, the system may be configured to analyze the API-related data traffic to determine whether the first API may be affected by exposure vectors. In some embodiments, exposure vectors may refer to pathways or methods used by an unauthorized person to access a network or an end-point device via an API. To this end, the system may be configured to deploy, via the ML subsystem, a second trained ML model on the data metrics captured from with the API-related data traffic associated with the first API.

In doing so, the system may be configured to determine, via the second trained ML model, a likelihood that the first API is affected by a first exposure vector. If the likelihood that the first API is affected by the first exposure vector satisfies an exposure threshold, then the system may be configured to determine that the first API is affected by an exposure vector (e.g., first exposure vector). In such cases, the system may be configured to invoke the remediation protocol to address the first exposure vector. In invoking the remediation protocol, the system may be configured to execute a second set of remediation actions on the first API, wherein the second set of remediation actions, when executed, ensure that the likelihood that the first API is affected by a first exposure vector does not satisfy the exposure threshold.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for network traffic discovery and analysis, the system comprising:
- a non-transitory storage device; and
- a processor coupled to the non-transitory storage device, wherein the processor is configured to:
  - capture, in real-time, data traffic across network ports in a computing environment;
  - retrieve source code from code repositories;
  - determine that the data traffic and the source code are associated with application programming interface (API) traffic;
  - determine a first API associated with the API traffic;
  - determine, using a machine learning (ML) subsystem, whether the first API meets supervisory requirements;
  - deploy, via the ML subsystem, a second trained ML model on the data metrics captured from with the API-related data traffic associated with the first API;
  - determine, via the second trained ML model, a likelihood that the first API is affected by a first exposure vector;
  - determine that the first API is affected by the first exposure vector in an instance in which the likelihood that the first API is affected by a first exposure vector satisfies an exposure threshold; and
  - invoke a remediation protocol in an instance when the first API does not meet supervisory requirements and when the first AIP is affected by the first exposure vector.

2. The system of claim 1, wherein, in determining the first API associated with the API traffic, the processor is further configured to:
- determine a destination IP address from the API traffic;
- map the destination IP address to a first end-point device; and
- determine that the first end-point device is associated with the first API.

3. The system of claim 1, wherein the processor is further configured to:
- receive API-related data traffic associated with the one or more APIs, one or more supervisory requirements for the one or more APIs, and one or more indications of whether the one or more APIs meet the one or more supervisory requirements for the one or more APIs;
- generate a first feature set using the API-related data traffic associated with the one or more APIs, the one or more supervisory requirements for the one or more APIs, and the one or more indications of whether the one or more APIs meet the one or more supervisory requirements for the one or more APIs; and
- train, using the ML subsystem, a first ML model using the first feature set.

4. The system of claim 1, wherein the processor is further configured to:
- monitor API-related data traffic associated with the first API for a first time period; and
- capture data metrics from with the API-related data traffic associated with the first API.

5. The system of claim 4, wherein the processor is further configured to:

deploy, via the ML subsystem, a first trained ML model on the data metrics captured from with the API-related data traffic and the supervisory requirements associated with the first API;

determine, via the first trained ML model, a likelihood of adherence of the first API to the supervisory requirements; and determine that the first API meets the supervisory requirements in an instance in which the likelihood of adherence of the first API to the supervisory requirements satisfies a security threshold.

6. The system of claim 5, wherein the processor is further configured to:

determine that the first API does not meet the supervisory requirements in an instance in which the likelihood of adherence of the first API to the supervisory requirements does not satisfy the security threshold.

7. The system of claim 6, wherein, in invoking the remediation protocol, the processor is further configured to execute a first set of remediation actions on the first API, wherein the first set of remediation actions, when executed, ensure that the likelihood of adherence of the first API to the supervisory requirements satisfies the security threshold.

8. The system of claim 1, wherein, in invoking the remediation protocol, the processor is further configured to execute a second set of remediation actions on the first API, wherein the second set of remediation actions, when executed, ensure that the likelihood that the first API is affected by a first exposure vector does not satisfy the exposure threshold.

9. The system of claim 1, wherein the processor is further configured to:

determine a second API associated with the API traffic;

determine one or more end-point devices associated with the second API;

transmit a notification to the one or more end-point devices, wherein the notification comprises a recommendation to use the first API instead of the second API.

10. A computer program product for network traffic discovery and analysis, the computer program product comprising a non-transitory computer-readable medium comprising code causing an apparatus to:

Capture, in real-time, data traffic across network ports in a computing environment;

retrieve source code from code repositories;

determine that the data traffic and the source code are associated with application programming interface (API) traffic;

determine a first API associated with the API traffic;

determine, using a machine learning (ML) subsystem, whether the first API meets supervisory requirements;

deploy, via the ML subsystem, a second trained ML model on the data metrics captured from with the API-related data traffic associated with the first API;

determine, via the second trained ML model, a likelihood that the first API is affected by a first exposure vector;

determine that the first API is affected by the first exposure vector in an instance in which the likelihood that the first API is affected by a first exposure vector satisfies an exposure threshold; and invoke a remediation protocol in an instance when the first API does not meet supervisory requirements and when the first AIP is affected by the first exposure vector.

11. The computer program product of claim 10, wherein, in determining the first API associated with the API traffic, the apparatus is further configured to:

determine a destination IP address from the API traffic;

map the destination IP address to a first end-point device; and determine that the first end-point device is associated with the first API.

12. The computer program product of claim 10, wherein the apparatus is further configured to:

receive API-related data traffic associated with the one or more APIs, one or more supervisory requirements for the one or more APIs, and one or more indications of whether the one or more APIs meet the one or more supervisory requirements for the one or more APIs;

generate a first feature set using the API-related data traffic associated with the one or more APIs, the one or more supervisory requirements for the one or more APIs, and the one or more indications of whether the one or more APIs meet the one or more supervisory requirements for the one or more APIs; and train, using the ML subsystem, a first ML model using the first feature set.

13. The computer program product of claim 10, wherein the apparatus is further configured to:

monitor API-related data traffic associated with the first API for a first time period; and capture data metrics from with the API-related data traffic associated with the first API.

14. The computer program product of claim 13, wherein the apparatus is further configured to:

deploy, via the ML subsystem, a first trained ML model on the data metrics captured from with the API-related data traffic and the supervisory requirements associated with the first API;

determine, via the first trained ML model, a likelihood of adherence of the first API to the supervisory requirements; and determine that the first API meets the supervisory requirements in an instance in which the likelihood of adherence of the first API to the supervisory requirements satisfies a security threshold.

15. The computer program product of claim 14, wherein the apparatus is further configured to:

determine that the first API does not meet the supervisory requirements in an instance in which the likelihood of adherence of the first API to the supervisory requirements does not satisfy the security threshold.

16. The computer program product of claim 15, wherein, in invoking the remediation protocol, the apparatus is further configured to execute a first set of remediation actions on the first API, wherein the first set of remediation actions, when executed, ensure that the likelihood of adherence of the first API to the supervisory requirements satisfies the security threshold.

17. A method for network traffic discovery and analysis, the method comprising:

capturing, in real-time, data traffic across network ports in a computing environment;

retrieving source code from code repositories;

determining that the data traffic and the source code are associated with application programming interface (API) traffic;

determining a first API associated with the API traffic;

determining, using a machine learning (ML) subsystem, whether the first API meets supervisory requirements;

deploying, via the ML subsystem, a second trained ML model on the data metrics captured from with the API-related data traffic associated with the first API;

determining, via the second trained ML model, a likelihood that the first API is affected by a first exposure vector;

determining that the first API is affected by the first exposure vector in an instance in which the likelihood that the first API is affected by a first exposure vector satisfies an exposure threshold; and invoking a remediation protocol in an instance when the first API does not meet supervisory requirements and when the first AIP is affected by the first exposure vector.

* * * * *